(12) United States Patent
Bharadwaj et al.

(10) Patent No.: US 8,998,588 B2
(45) Date of Patent: Apr. 7, 2015

(54) SEGMENTED FAN ASSEMBLY

(75) Inventors: Madhu Bharadwaj, Bangalore (IN); Alexander Gabriel Beckford, Glenville, NY (US); Rajiv Rajan, Schenectady, NY (US); Sadeo Ramtahal, Schenectady, NY (US); Samir Armando Salamah, Niskayuna, NY (US); Henry August Scarton, Troy, NY (US); Devon Walter Story, Mountain View, CA (US); Donald Alden VanSlyke, Delmar, NY (US); Kyle Richard Wilt, Sand Lake, NY (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 13/212,254

(22) Filed: Aug. 18, 2011

(65) Prior Publication Data

US 2013/0045120 A1  Feb. 21, 2013

(51) Int. Cl.
| | |
|---|---|
| F04B 17/00 | (2006.01) |
| F04B 35/04 | (2006.01) |
| F01D 9/00 | (2006.01) |
| F04D 29/44 | (2006.01) |
| F04D 29/54 | (2006.01) |
| F04D 29/28 | (2006.01) |
| H02K 9/06 | (2006.01) |

(52) U.S. Cl.
CPC .............. F04D 29/282 (2013.01); H02K 9/06 (2013.01)

(58) Field of Classification Search
CPC ................. F04D 29/282; H02K 9/06

USPC ......... 417/410.1, 423.1, 423.6; 415/182, 206; 310/62, 63

See application file for complete search history.

(56) References Cited

U.S. PATENT DOCUMENTS

| | | | | |
|---|---|---|---|---|
| 1,327,926 A | * | 1/1920 | Scott | 415/98 |
| 1,378,008 A | * | 5/1921 | Candee | 416/187 |
| 2,033,058 A | * | 3/1936 | Williamson | 310/64 |
| 2,183,079 A | * | 12/1939 | Kropp | 415/119 |
| 2,549,208 A | * | 4/1951 | Kice, Jr. | 416/184 |
| 2,550,443 A | * | 4/1951 | Bennett | 310/57 |

(Continued)

FOREIGN PATENT DOCUMENTS

| | | |
|---|---|---|
| EP | 0789149 A1 | 8/1997 |
| EP | 1329185 A2 | 7/2003 |

(Continued)

OTHER PUBLICATIONS

Search Report for corresponding Great Britain Application No. 1214576.9, dated Dec. 3, 2012.

*Primary Examiner* — Charles Freay
*Assistant Examiner* — Lilya Pekarskaya
(74) *Attorney, Agent, or Firm* — Ernest G. Cusick; Hoffman Warnick LLC

(57) ABSTRACT

Systems and devices for thermodynamically regulating portions of a dynamoelectric machine are disclosed. In one embodiment, a fan assembly element includes: an axially inner shroud segment configured to form a portion of an annular assembly about a rotor of a dynamoelectric machine, wherein the axially inner shroud segment includes a rotor hub interface configured to physically connect to a complementary portion of a rotor hub; a set of fan blades physically connected to and extending axially from a face of the axially inner shroud segment; and an axially outer shroud segment physically connected to the set of fan blades.

20 Claims, 11 Drawing Sheets

(56) References Cited

U.S. PATENT DOCUMENTS

| | | | |
|---|---|---|---|
| 3,224,194 A * | 12/1965 | De Feo et al. | 60/793 |
| 3,358,913 A * | 12/1967 | Beesley | 416/178 |
| 4,132,912 A * | 1/1979 | Wright | 310/62 |
| 4,286,183 A * | 8/1981 | Montgomery | 310/62 |
| 4,515,527 A | 5/1985 | Baker | |
| 5,988,980 A * | 11/1999 | Busbey et al. | 416/193 R |
| 6,007,300 A | 12/1999 | Saeki et al. | |
| 6,189,492 B1 * | 2/2001 | Brown | 123/41.49 |
| 6,375,421 B1 * | 4/2002 | Lammas et al. | 415/199.5 |
| 6,435,828 B1 * | 8/2002 | Bostwick | 416/175 |
| 6,951,112 B2 * | 10/2005 | Czachor | 60/798 |
| 7,121,793 B2 * | 10/2006 | Correia | 415/191 |
| 7,484,925 B2 * | 2/2009 | Carlson et al. | 415/79 |
| 7,556,218 B2 | 7/2009 | Schlunke | |
| 7,597,541 B2 | 10/2009 | White | |
| 7,722,329 B2 * | 5/2010 | Clarke | 416/223 R |
| 7,771,169 B2 | 8/2010 | Kikuchi et al. | |
| 2003/0077174 A1 | 4/2003 | Kim | |
| 2007/0014675 A1 | 1/2007 | Nagamatsu et al. | |
| 2007/0098571 A1 | 5/2007 | Nagamatsu | |
| 2007/0217908 A1 | 9/2007 | Ochiai et al. | |
| 2009/0129919 A1 | 5/2009 | Yamasaki et al. | |
| 2010/0089090 A1 * | 4/2010 | Kim et al. | 62/426 |
| 2011/0023526 A1 | 2/2011 | Ohyama | |
| 2012/0181792 A1 * | 7/2012 | Pettersen et al. | 290/55 |
| 2012/0280583 A1 * | 11/2012 | Fish | 310/63 |

FOREIGN PATENT DOCUMENTS

| | | |
|---|---|---|
| EP | 1329185 A3 | 8/2003 |
| JP | 49044441 B | 11/1974 |
| JP | 58133499 A | 8/1983 |
| NO | 330062 * | 2/2011 |

* cited by examiner

SEGMENTED FAN ASSEMBLY

BACKGROUND OF THE INVENTION

The subject matter disclosed herein relates to dynamoelectric machines and, more particularly, to a segmented fan assembly for a generator.

Some power plant systems, for example certain nuclear, simple cycle and combined cycle power plant systems, employ generators in their design and operation. During operation, these generators may produce large amounts of heat which may damage components and/or decrease the efficiency of the generator and/or overall power plant system. As a result, some generators include a set of fan assemblies connected/affixed to the generator rotor. During operation, these fan assemblies are configured to pass a fluid/coolant through portions of the generator, thereby thermally regulating components and increasing generator efficiency and lifespan. These fan assemblies may include multiple components (e.g. shrouds, fan blades, etc.) of varying sizes which must be securely connected to one another in such a way, as to be tolerant of the differences in material properties of each component. Connecting these components may be a complex, expensive and time-consuming process. In an effort to decrease fabrication time, the components of some fan assemblies are welded together. In some other fan assemblies, the components may be riveted together, which may allow for greater durability and component lifespan. However, riveting the components together may significantly increase the fabrication time of a given fan assembly, and welding the components together may lead to stress fractures and fatigue at the weld fillet.

BRIEF DESCRIPTION OF THE INVENTION

Systems and devices including a segmented fan assembly for thermally regulating portions of a dynamoelectric machine are disclosed. In one embodiment, a fan assembly element includes: an axially inner shroud segment configured to form a portion of an annular assembly about a rotor of a dynamoelectric machine, wherein the axially inner shroud segment includes a rotor hub interface configured to physically connect to a complementary portion of a rotor hub; a set of fan blades physically connected to and extending axially from a face of the axially inner shroud segment; and an axially outer shroud segment physically connected to the set of fan blades.

A first aspect of the invention provides a fan assembly element including: an axially inner shroud segment configured to form a portion of an annular assembly about a rotor of a dynamoelectric machine, wherein the axially inner shroud segment includes a rotor hub interface configured to physically connect to a complementary portion of a rotor hub; a set of fan blades physically connected to and extending axially from a face of the axially inner shroud segment; and an axially outer shroud segment physically connected to the set of fan blades.

A second aspect of the invention provides a fan assembly including: a rotor hub; and a set of fan assembly elements physically connected to the rotor hub, wherein each of the fan assembly elements is physically connected to adjacent fan assembly elements in the set of fan assembly elements to form a substantially continuous body, and each fan assembly element includes: an axially inner shroud segment configured to form a portion of an annular assembly about a rotor of a dynamoelectric machine, wherein the axially inner shroud segment includes a rotor hub interface configured to physically connect to a complementary portion of the rotor hub; a set of fan blades physically connected to and extending axially from a face of the axially inner shroud segment; and an axially outer shroud segment physically connected to the set of fan blades.

A third aspect of the invention provides a dynamoelectric machine including: a stator; a rotor disposed substantially within the stator; a rotor hub disposed circumferentially about a portion of the rotor; and a set of fan assembly elements physically connected to the rotor hub, wherein each of the fan assembly elements is physically connected to adjacent fan assembly elements in the set of fan assembly elements to form a substantially continuous body, and each of the fan assembly elements includes: an axially inner shroud segment configured to form a portion of an annular assembly about a rotor of a dynamoelectric machine, wherein the axially inner shroud segment includes a rotor hub interface configured to physically connect to a complementary portion of the rotor hub; a set of fan blades physically connected to and extending axially from a face of the axially inner shroud segment; and an axially outer shroud segment physically connected to the set of fan blades.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for a segmented fan assembly for passing a fluid/coolant through portions of a dynamoelectric machine, thereby, thermally regulating components of the dynamoelectric machine. The segmented fan assembly includes a plurality of complementary fan assembly elements which may be individually installed within and/or removed from the segmented fan assembly.

As noted herein, in the art of power generation systems (including, e.g., nuclear reactors, steam turbines, gas turbines, etc.), dynamoelectric machines are often included as part of the system. These dynamoelectric machines often include fan assemblies which cool and/or thermally regulate sections of the dynamoelectric machine. Typically, these fan assemblies include multiple components assembled together to pass a fluid/coolant through and between different sections of the dynamoelectric machine to regulate the operating temperature. However, fabrication, installation and maintenance of the varied components within these fan assemblies may be an expensive and time consuming process. The components of many fan assemblies are either welded or riveted together, forming a continuous circular fan assembly which may then be affixed, connected and/or shrunk-fit onto the rotor. Welding and/or riveting may increase the fabrication time and lead to component failures as a result of stress concentrations and/or fatigue. Further, shrink fitting of the assembly on the rotor as well as welding and riveting of the components may increase the rewind time for the dynamoelectric machine, thereby increasing system stoppage time and maintenance costs.

In contrast to the conventional approaches, aspects of the invention provide for a segmented fan assembly which includes a plurality of substantially independent fan assembly elements. These fan assembly elements may be configured about a rotor hub adjacent one another so as to substantially form the segmented fan assembly. Each fan assembly element may be independently fastened upon and/or removed from the rotor hub, thereby decreasing the delays and costs associated with fabrication and/or maintenance of the segmented fan assembly.

Figure 1:
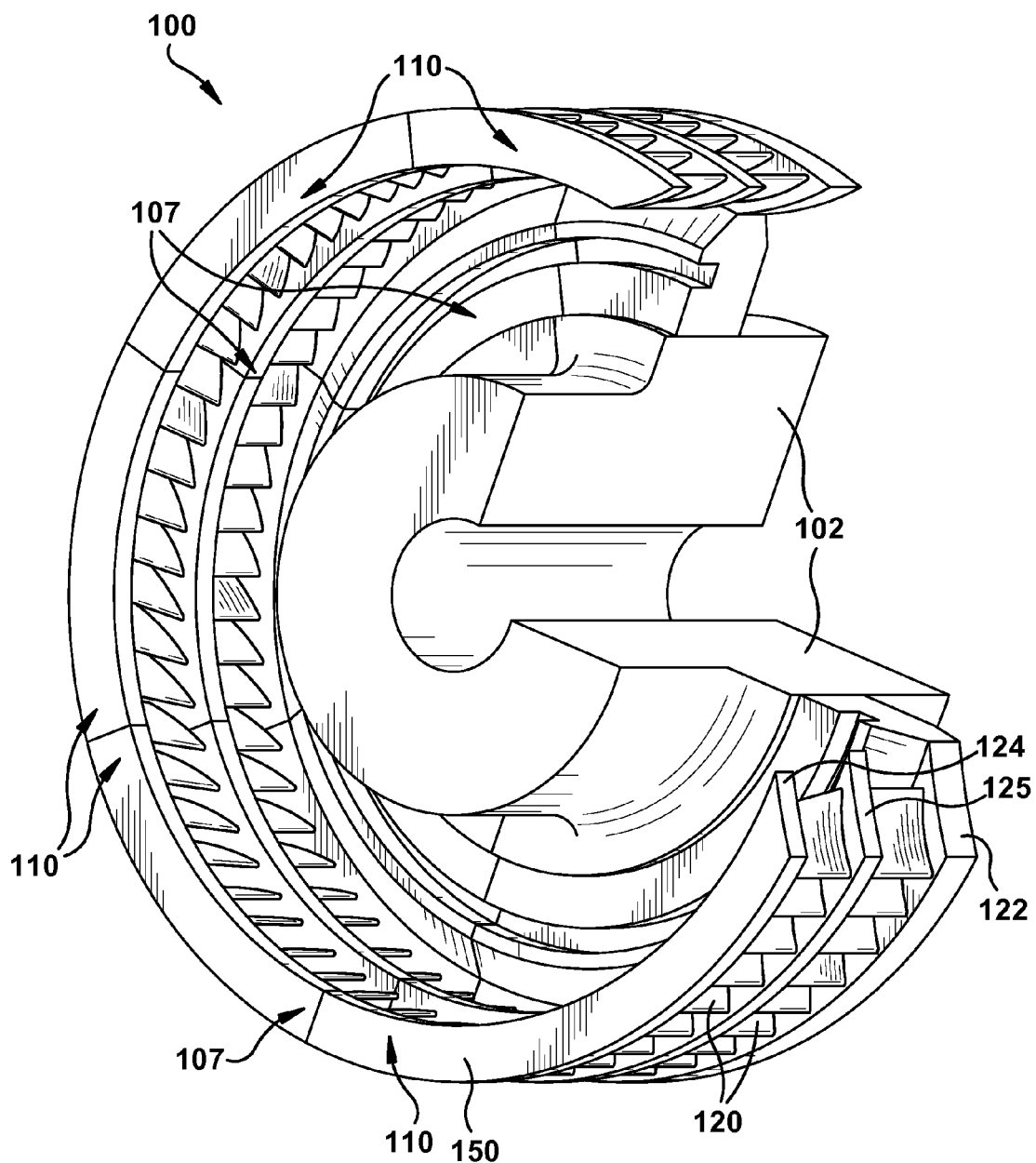
FIG. 1 shows a three-dimensional perspective view of a segmented fan assembly including a set of fan assembly elements, in accordance with aspects of the invention.

Turning to FIG. 1, a three-dimensional perspective view of an embodiment of a segmented fan assembly 100 is shown. Fan assembly 100 includes a plurality of fan assembly elements 110 connected to a rotor hub 102. Fan assembly elements 110 are radially tapered and configured about rotor hub 102 in substantially flush contact with one another so as to form a substantially continuous annular body (e.g. fan assembly 100). Each fan assembly element 110 may include a plurality of fan blades 120 which extend axially between an axially inner shroud segment 122 and an axially outer shroud segment 124. These fan blades 120 may be used to distribute a fluid/coolant between components and/or sections of a dynamoelectric machine (not shown). In one embodiment, fan assembly elements 110 may partially overlap at a seal joint 107. In one embodiment, seal joint 107 may be oriented substantially radially, such that seal joint 107 extends radially between adjacent fan assembly elements 110. In another embodiment, fan assembly elements 110 may be configured with a curved and/or arcuate shape. In one embodiment, each fan assembly element 110 of fan assembly 100, may include a single fan blade 120. In another embodiment, each fan assembly element 110 of fan assembly 100, may include a plurality fan blades 120. Assembly of a plurality of radially tapered and/or arcuately shaped fan assembly elements 110 may form a substantially circular and/or elliptical body in the form of fan assembly 100. Connection, fastening, assembly and manner of assembly of fan assembly elements 110 may be accomplished in any number of ways as discussed further below or known in the art.

Figure 2:
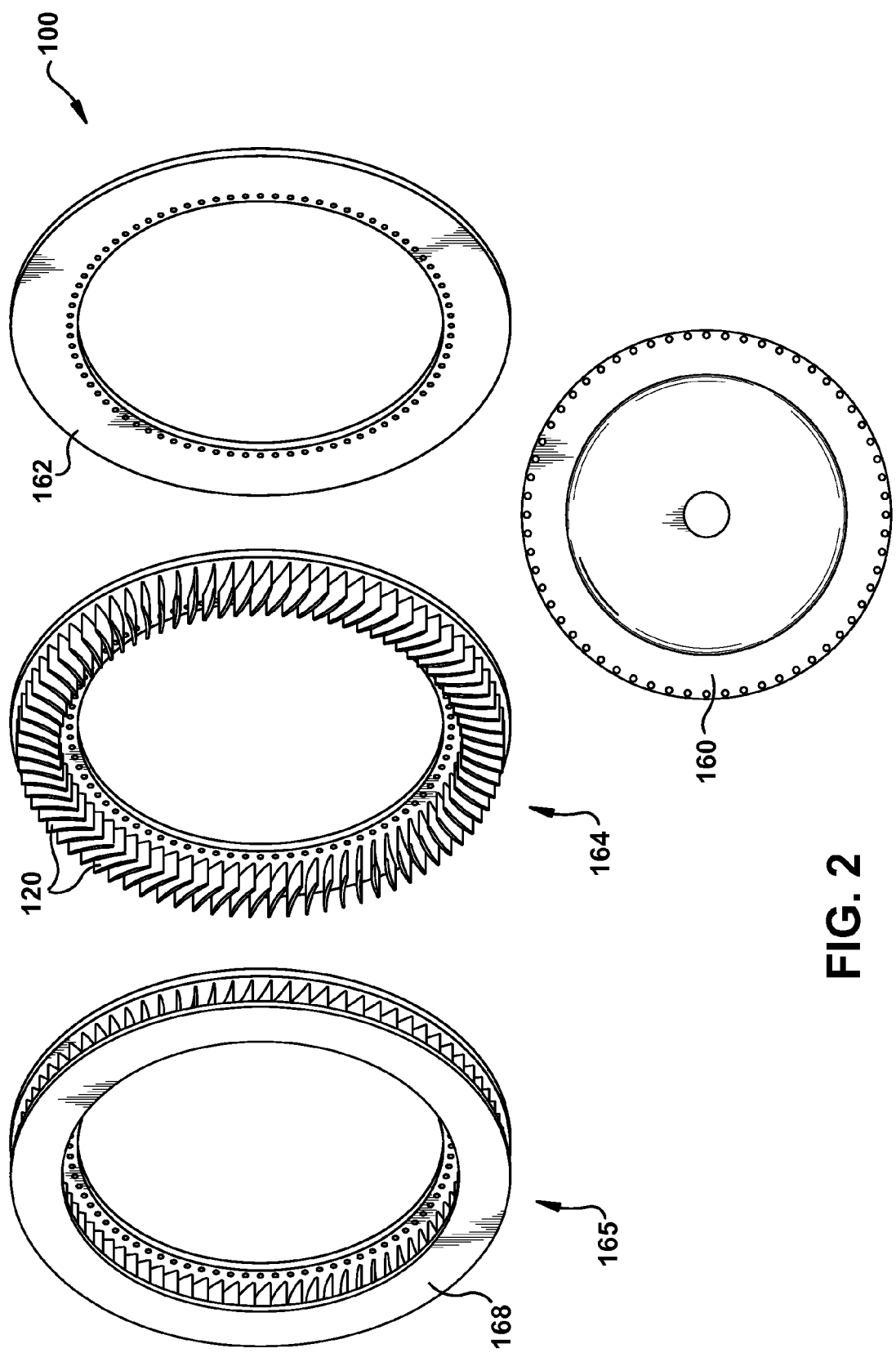
FIG. 2 shows a partial blow-out three-dimensional perspective view of portions of a fan assembly in accordance with aspects of the invention.

In an embodiment of the present invention, fan assembly elements 110 may include an axially central shroud segment 125 which segments the plurality of fan blades 120 between axially inner shroud segment 122 and axially outer shroud segment 124. In another embodiment, fan assembly 100 may include a shroud ring 150 installed upon axially outer shroud segments 124. In one embodiment, shroud ring 150 may substantially unify fan assembly elements 110 in fan assembly 100, thereby stabilizing fan assembly 100. In one embodiment, shroud ring 150 may be forged. In another embodiment, shroud ring 150 may be a continuous ring. In one embodiment, shroud ring 150 may be welded and/or riveted to axially outer shroud segments 124. In another embodiment, shroud ring 150 may be bolted to axially outer shroud segments 124. In one embodiment, shroud ring 150 may be installed upon outer shroud segments 124 after each fan assembly element 110 has been connected to rotor hub 102. In another embodiment, shroud ring 150 may guide installation of some fan assembly elements 110 into fan assembly 100. FIG. 2 shows a partial blow-out three-dimensional perspective view of fan assembly 100 according to embodiments of the invention. As shown, three portions of fan assembly 100 are illustrated in this blow-out view. It is understood that elements similarly numbered between FIG. 1 and FIG. 2 may be substantially similar as described with reference to FIG. 1. Further, in embodiments shown and described with reference to FIGS. 2-11, like numbering may represent like elements. Redundant explanation of these elements has been omitted for clarity. Finally, it is understood that the components of FIGS. 1-11 and their accompanying descriptions may be applied to any embodiment described herein. Returning to FIG. 2, in this embodiment, a first portion, a fan ring 162, may be physically connected to a shaft 160 of a dynamoelectric machine. A plurality of fan blades 120 may be disposed upon fan ring 162 forming a second portion 164. A second fan ring 168 may be disposed upon plurality of fan blades 120 thereby forming third portion 165. In one embodiment, third portion 165 may substantially form fan assembly 100.

Figure 3:
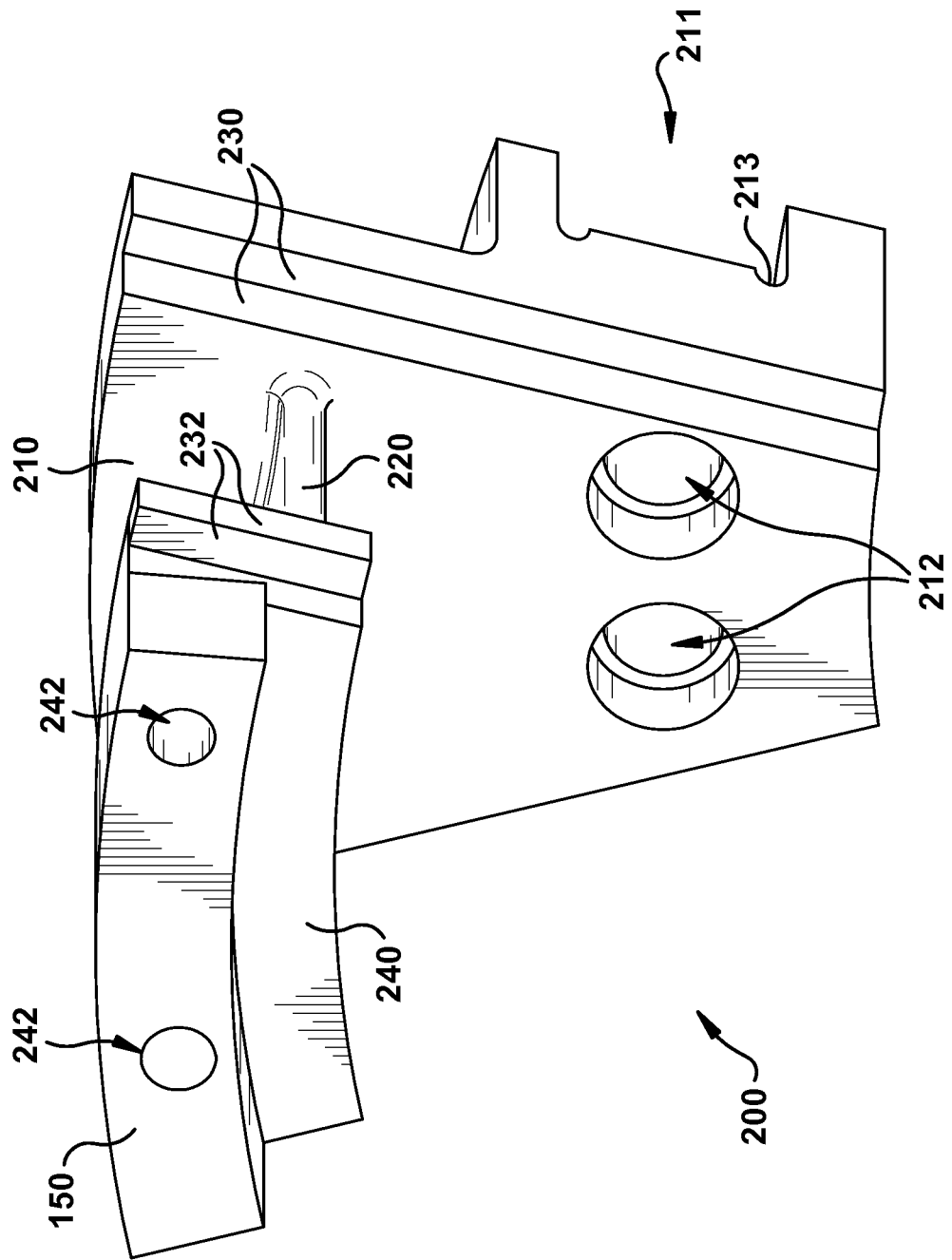
FIG. 3 shows a three-dimensional perspective view of portions of a fan assembly element in accordance with aspects of the invention.

Turning to FIG. 3, a three-dimensional perspective view of a fan assembly element 200 is shown according to embodiments of the invention. In this embodiment, fan assembly element 200 may include a fan blade 220 disposed between an axially inner shroud segment 210 and an axially outer shroud segment 240. In one embodiment, a first end of fan blade 220 may be connected to axially inner shroud segment 210 and a second end of fan blade 220 may be connected to axially outer shroud segment 240. In one embodiment, fan blade 220 may extend beyond a circumferentially facing surface of either or both of axially inner shroud segment 210 and axially outer shroud segment 240 so as to radially overlap with an adjacent fan blade 220 of a mated complementary fan assembly element 200. It is understood that fan blade 220 may be a vane, an airfoil, a twisted airfoil, or any form of fan blade known in the art. In this embodiment, axially inner shroud segment 210 is radially tapered and includes at least one circumferential mating surface 230 configured to mate and/or form a seal with an axially inner shroud segment 210 of a complementary fan assembly element 200. Axially outer shroud segment 240 is radially tapered and includes at least one circumferential mating surface 232 configured to mate and/or form a seal with an axially outer shroud segment 240 of a complementary fan assembly element 200. Circumferential mating surfaces 230 and 232 may include stepped patterns, slotted patterns, toothed patterns, textured surfaces, or any other form of sealing surface treatment and/or design known. In one embodiment, circumferential mating surfaces 230 and 232 may be configured to physically connect to a complementary fan assembly element 200 and form a damper for segmented fan assembly 100 (shown in FIG. 1). In one embodiment, axially inner shroud segment 210 and axially outer shroud segment 240 may have an arcuate shape.

In an embodiment of the present invention, fan assembly element 200 may be machined and/or formed from a substantially continuous piece of stock (e.g., a block of aluminum, a block of steel, etc.). In one embodiment, fan assembly element 200 may be machined and/or shaped from the piece of stock by a five-axis computer numerical control (CNC) machine/system. In one embodiment, fan assembly element 200 is created substantially from a single piece of stock/material. It is understood that the formation of fan assembly element 200 is not limited to machining by a five-axis CNC machine, and may be accomplished by any manufacturing techniques known in the art. In another embodiment, axially inner shroud segment 210, axially outer shroud segment 240 and fan blade 220 may be welded and/or riveted together to form a substantially continuous fan assembly element 200. Axially inner shroud segment 210, axially outer shroud segment 240 and fan blade 220 may be formed of the same or distinct materials. In one embodiment, axially inner shroud segment 210, axially outer shroud segment 240 and fan blade 220 may be formed or manufactured as a substantially continuous fan assembly element 200. In another embodiment, fan assembly element 200 may be formed via a casting process, a material (e.g., aluminum, steel, etc.) being poured into a mold to form a substantially uniform fan assembly element 200.

In an embodiment of the present invention, axially inner shroud segment 210 may include a rotor hub interface 211. Rotor hub interface 211 is configured to physically connect to a complementary portion of rotor hub 102 (shown in FIG. 1). In one embodiment, rotor hub interface 211 may be a rabbet, a channel, a groove, and/or a recess in an axial face of axially inner shroud segment 210 which is configured to receive a complementary portion of rotor hub 102. In one embodiment, a set of undercuts 213 are provided within rotor hub interface 211. In another embodiment, axially inner shroud segment 210 defines a set of apertures 212 which are configured to receive a set of bolts, the set of bolts for connecting fan assembly element 200 to rotor hub 102. In one embodiment, the set of apertures 212 may be counter-bored. In one embodiment, the set of bolts may be either temperature locked and/or spot welded into the set of apertures 212. It is understood that the set of bolts may include screws, rivets and/or any other form of fastening device as is known in the art. In another embodiment, shroud ring 150 may connect to a portion of axially outer shroud segment 240. In one embodiment, shroud ring 150 may be welded and/or riveted to axially outer shroud segment 240. In another embodiment, shroud ring 150 may define a set of apertures 242 which are configured to receive a set of bolts, the set of bolts for connecting shroud ring 150 to axially outer shroud segment 240. In one embodiment, the set of apertures 242 may be counter-bored. In one embodiment, the set of bolts may be either temperature locked and/or spot welded into the set of apertures 242.

Figure 4:
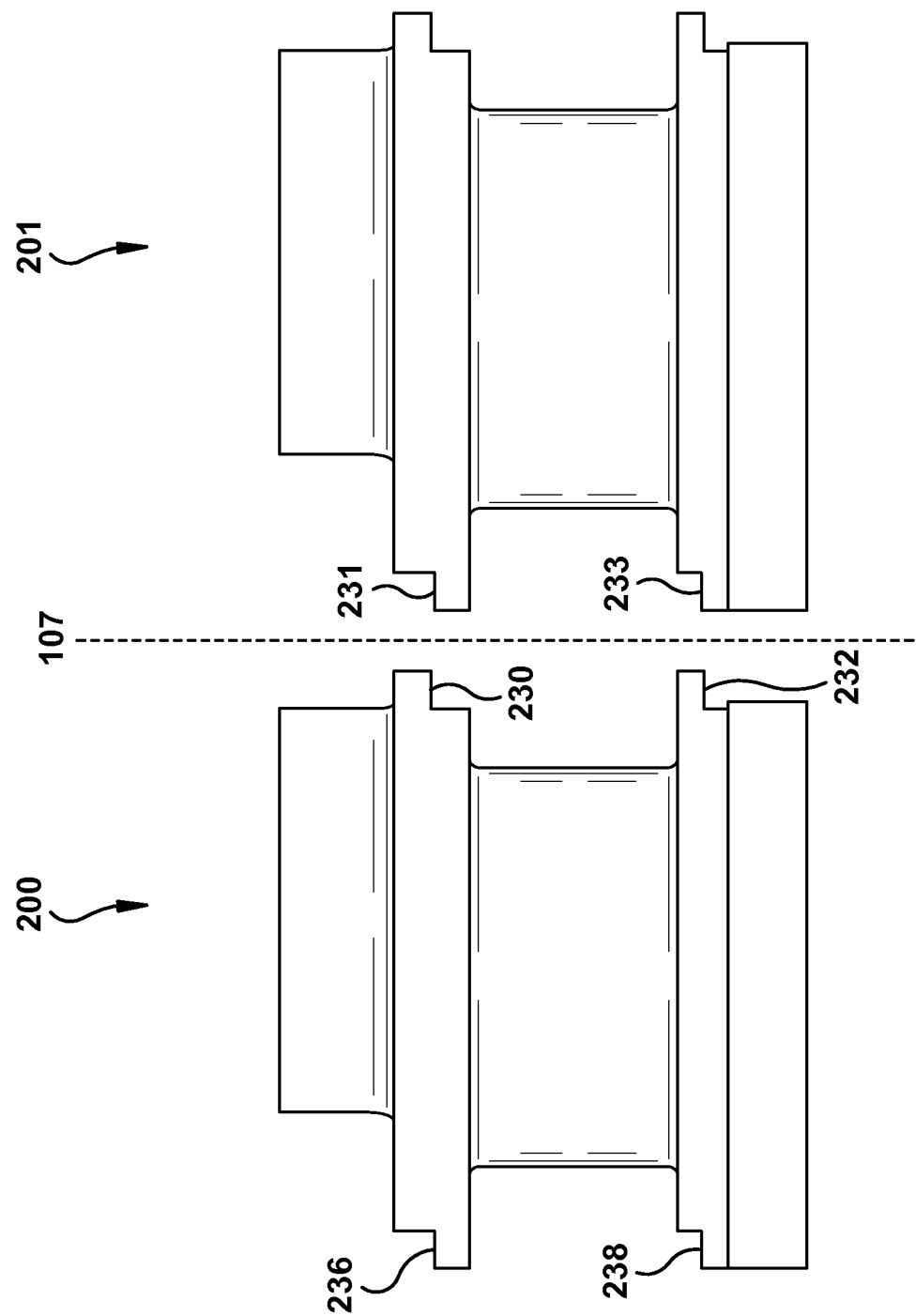
FIG. 4 shows a partial cross-sectional view of portions of a fan assembly in accordance with aspects of the invention.

Turning to FIG. 4, a partial cross-sectional view of portions of an embodiment of a fan assembly 100 are shown. In this embodiment, fan assembly element 200 and a complementary fan assembly element 201 are configured adjacent one another so as to substantially form a seal at seal joint 107. In this embodiment, circumferential mating surface 230 of fan assembly element 200 is configured to substantially complement a circumferential mating surface 231 of complementary fan assembly element 201, thereby substantially overlapping and forming a seal. Circumferential mating surface 232 of fan assembly element 200 is configured to substantially complement a circumferential mating surface 233 of complementary fan assembly element 201, thereby substantially overlapping and forming a seal. In one embodiment, fan assembly element 200 may include a circumferential mating surface 236 and a circumferential mating surface 238 configured to complement and substantially form a seal with a second fan assembly element (not shown).

Figure 5:
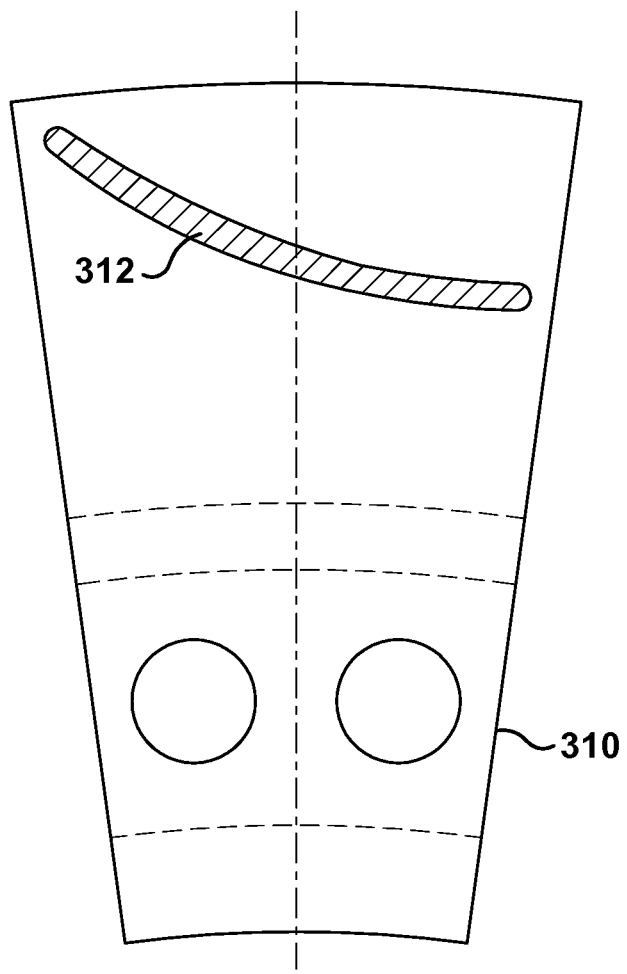
FIG. 5 shows a partial cross-sectional view of portions of a fan assembly element in accordance with aspects of the invention.
Figure 6:
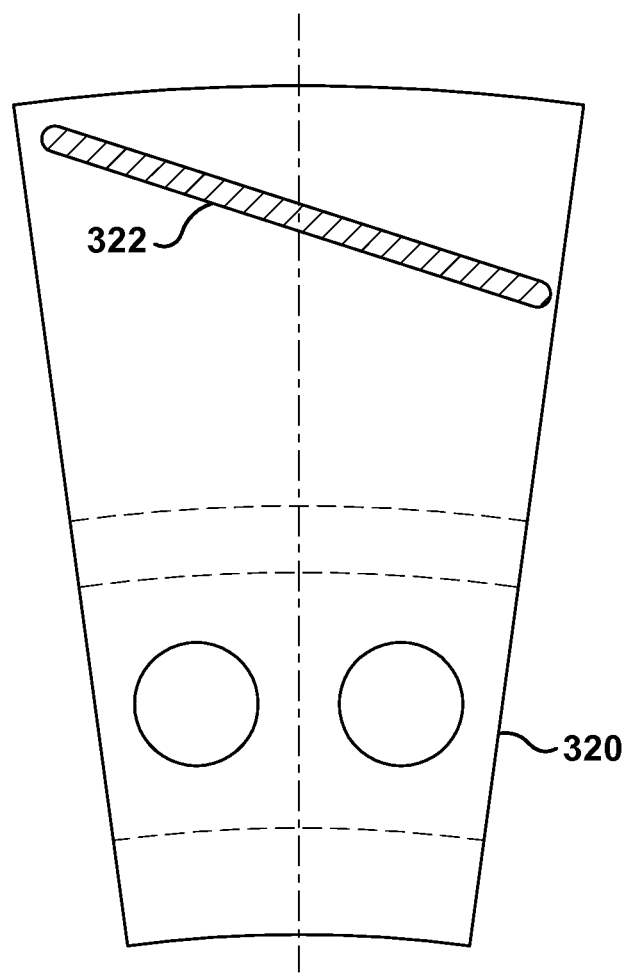
FIG. 6 shows a partial cross-sectional view of portions of a fan assembly element in accordance with aspects of the invention.
Figure 7:
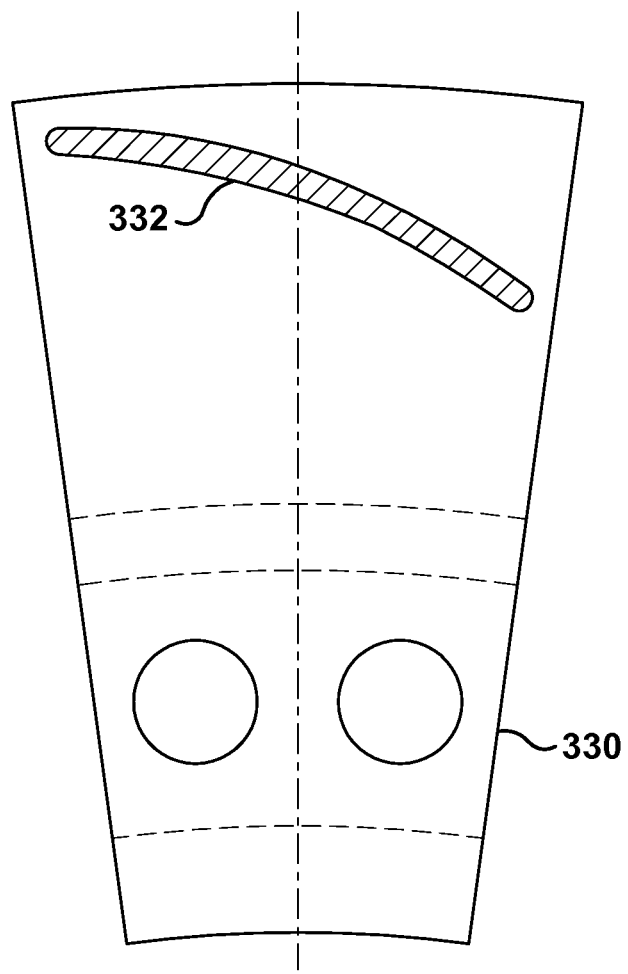
FIG. 7 shows a partial cross-sectional view of portions of a fan assembly element in accordance with aspects of the invention.

Turning to FIG. 5, a partial cross-sectional view of portions of an embodiment of a fan assembly element 310 including a fan blade 312 with a substantially convex shape is shown. In another embodiment, shown in FIG. 6, a fan assembly element 320 includes a fan blade 322 with a substantially linear shape. In another embodiment, shown in FIG. 7, a fan assembly element 330 includes a fan blade 332 with a substantially concave shape. It is understood that any of fan blade 312, 322, or 332 may be included separately or together in fan assembly 100 and/or fan assembly elements 110 of FIG. 1 or any other embodiments. Further, fan blade 312, 322, or 332 may include an airfoil profile and/or a twisted configuration.

Figure 8:
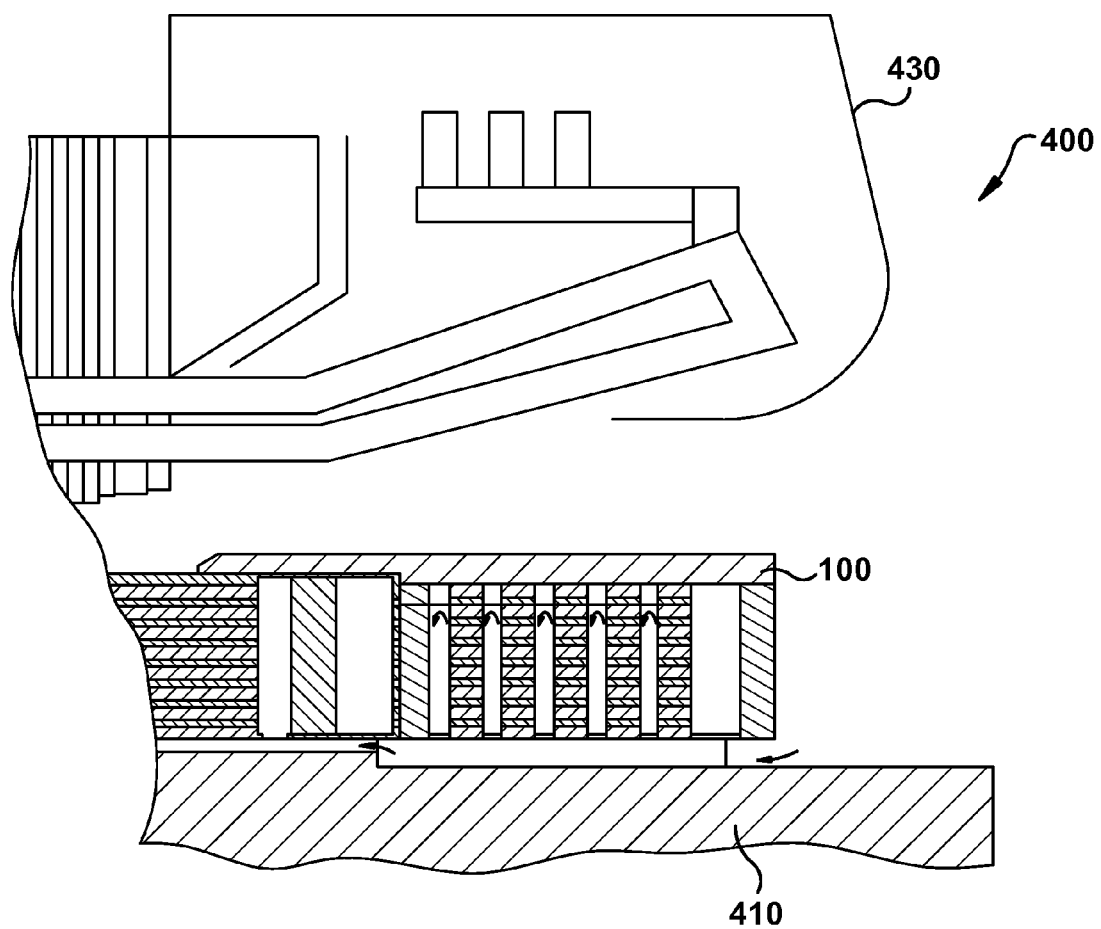
FIG. 8 shows a partial cut-away side view of an embodiment of a dynamoelectric machine in accordance with aspects of the invention.
Figure 9:
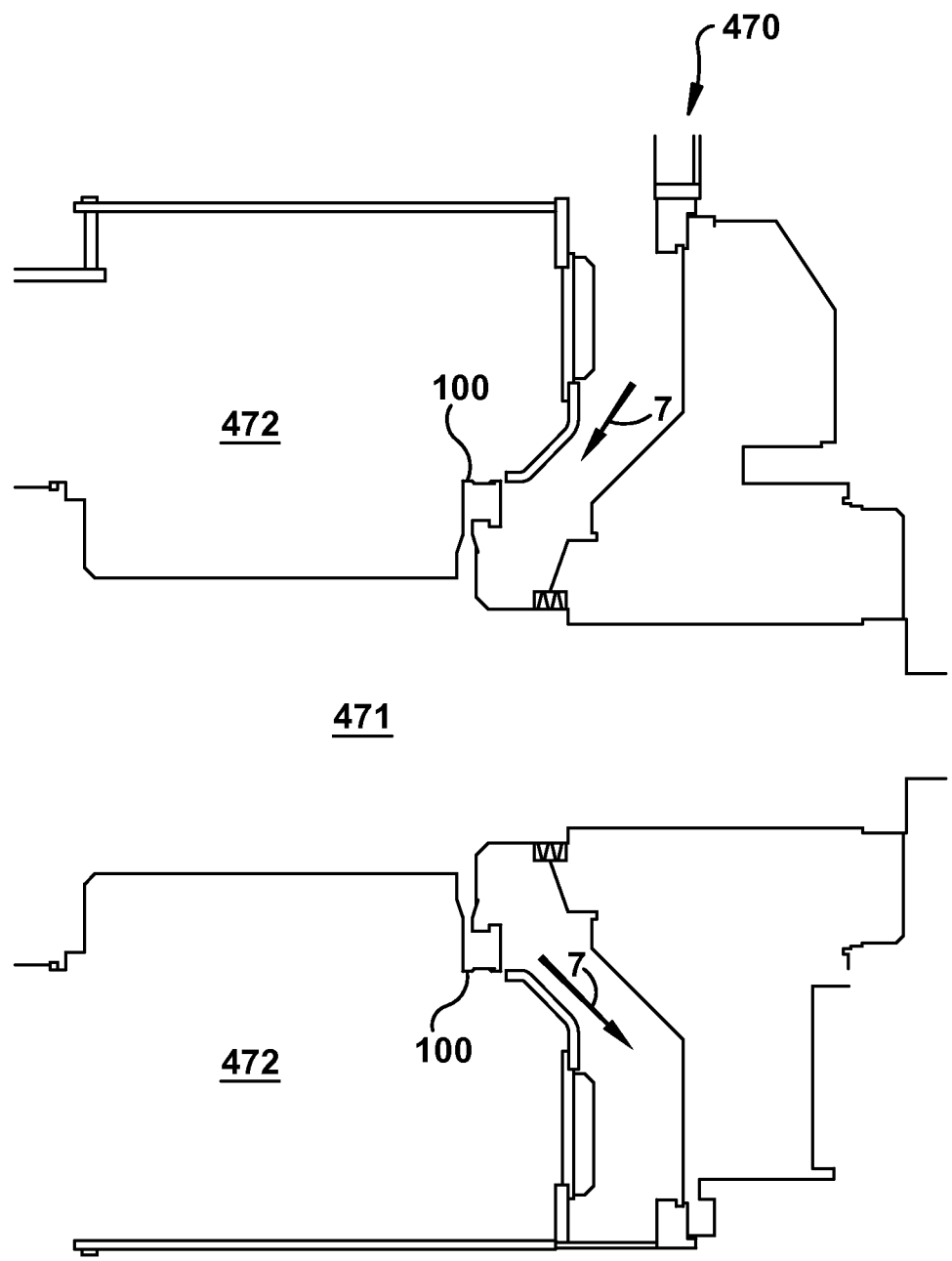
FIG. 9 shows a partial cut-away side view of an embodiment of a dynamoelectric machine in accordance with aspects of the invention.

Turning to FIG. 8, a partial cut-away side view of an embodiment of a dynamoelectric machine 400 is shown having fan assembly 100 disposed upon a rotor 410 of dynamoelectric machine 400. In this embodiment, dynamoelectric machine 400 includes a stator 430 substantially enclosing rotor 410 and fan assembly 100. In an embodiment of the present invention, fan assembly 100 may be physically connected to rotor 410 of dynamoelectric machine 400. In one embodiment of the present invention, fan assembly 100 may be shrunk fit on rotor 410. In another embodiment, rotor hub 102 (shown in FIG. 1) of fan assembly 100 may be integral to rotor 410. In another embodiment, rotor hub 102 may be welded onto rotor 410. In one embodiment, operation of rotor 410 also rotates fan assembly 100. It is understood that the location of fan assembly 100 in this embodiment is not limited to this exemplary embodiment as fan assembly 100 may be disposed within any section of dynamoelectric machine 400 or like generator as is known. Turning to FIG. 9, a partial cut-away side view of an embodiment of a dynamoelectric machine 400 is shown having fan assembly 100 disposed within a dynamoelectric machine 470. In this embodiment, fan assembly 100 is configured about a rotor 471 such that operation of dynamoelectric machine 470 may cause the generation of fluid flow 7 by fan assembly 100, rotor 471 being substantially enclosed by a stator 472. In one embodiment, fan assembly 100 may substantially pull fluid 7 into dynamoelectric machine 470. In another embodiment, fan assembly 100 may substantially push fluid flow 7 out of dynamoelectric machine 470.

Figure 10:
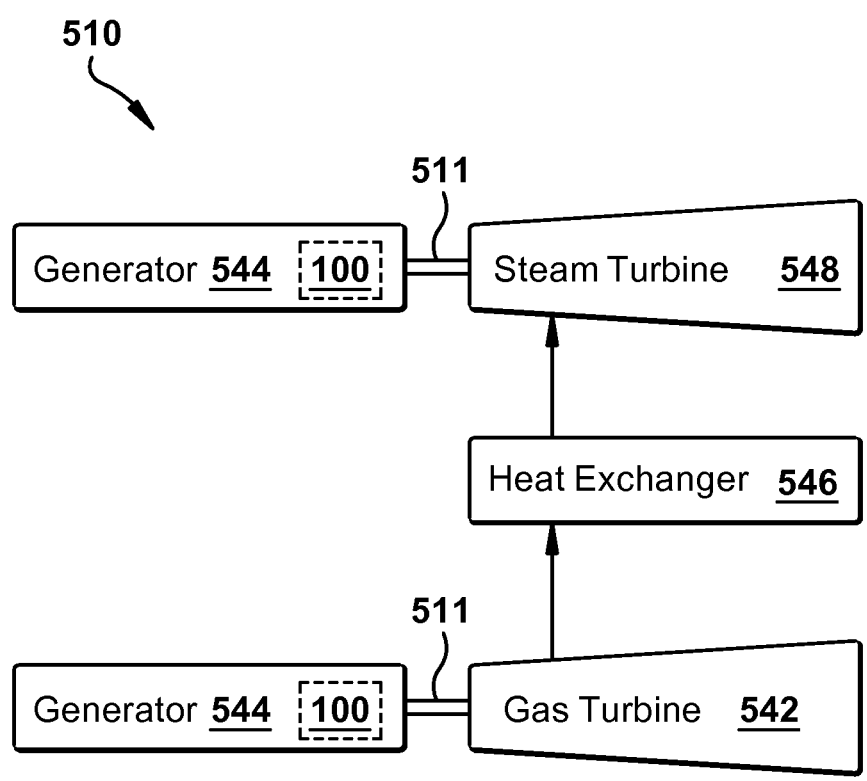
FIG. 10 shows a schematic view of portions of a multi-shaft combined cycle power plant in accordance with an aspect of the invention.
Figure 11:
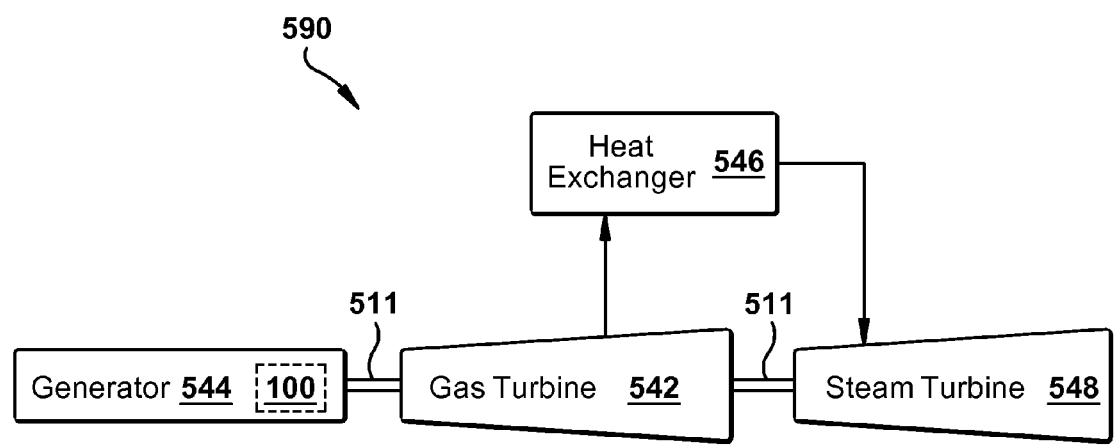
FIG. 11 shows a schematic view of a single shaft combined cycle power plant in accordance with an aspect of the invention.

Turning to FIG. 10, a schematic view of portions of a multi-shaft combined cycle power plant 510 is shown. Combined cycle power plant 510 may include, for example, a gas turbine 542 operably connected to a dynamoelectric machine 544. Dynamoelectric machine 544 may include fan assembly 100 of FIG. 1 or other embodiments described herein. Dynamoelectric machine 544 and gas turbine 542 may be mechanically coupled by a shaft 511, which may transfer energy between a drive shaft (not shown) of gas turbine 542 and dynamoelectric machine 544. Also shown in FIG. 10 is a heat exchanger 546 operably connected to gas turbine 542 and a steam turbine 548. Heat exchanger 546 may be fluidly connected to both gas turbine 542 and a steam turbine 548 via conventional conduits (numbering omitted). Heat exchanger 546 may be a conventional heat recovery steam generator (HRSG), such as those used in conventional combined cycle power systems. As is known in the art of power generation, HRSG 546 may use hot exhaust from gas turbine 542, combined with a water supply, to create steam which is fed to steam turbine 548. Steam turbine 548 may optionally be coupled to a second dynamoelectric machine 544 (via a second shaft 511) which may also include fan assembly 100 of FIG. 1 or other embodiments described herein. It is understood that dynamoelectric machines 544 and shafts 511 may be of any size or type known in the art and may differ depending upon their application or the system to which they are connected. Common numbering of the dynamoelectric machines and shafts is for clarity and does not necessarily suggest these dynamoelectric machines or shafts are identical. In another embodiment, shown in FIG. 11, a single shaft combined cycle power plant 590 may include a single dynamoelectric machine 544 coupled to both gas turbine 542 and steam turbine 546 via a single shaft 511. Single dynamoelectric machine 544 may include fan assembly 100 of FIG. 1 or other embodiments described herein.

The fan assembly systems and fan assembly elements of the present disclosure are not limited to any one particular dynamoelectric machine, generator motor, power generation system or other system, and may be used with other power generation systems (e.g., combined cycle, simple cycle, nuclear reactor, etc.).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan assembly element comprising:
   an axially inner shroud segment configured to form a portion of an annular assembly about a rotor of a dynamoelectric machine; wherein at least one circumferentially facing surface of the axially inner shroud segment includes a mating surface configured to form a seal with a circumferentially facing surface of a complementary fan assembly element;
   wherein the axially inner shroud segment includes a rotor hub interface configured to physically connect to a complementary portion of a rotor hub;
   a first set of fan blades physically connected to and extending axially from a face of the axially inner shroud segment; and
   a first axially outer shroud segment physically connected to the first set of fan blades; wherein the axially inner shroud segment and the first axially outer shroud segment are axially spaced from one another relative to the rotor hub;
   wherein each fan blade of the first set of fan blades includes a first axial end fully connected to the axially inner shroud segment and a second axial end fully connected to the first axially outer shroud segment; and
   wherein the fan assembly is configured to allow fluid flow between adjacent fan blades of the first set of fan blades during operation of the dynamoelectric machine.

2. The fan assembly element of claim 1, wherein the axially inner shroud segment defines a set of apertures configured to receive a set of bolts, wherein the set of bolts connecting the fan assembly element to the rotor hub.

3. The fan assembly element of claim 1, wherein a circumferentially facing surface of the first axially outer shroud segment includes at least one mating surface configured to form a seal with a circumferentially facing surface of a complementary fan assembly element.

4. The fan assembly element of claim 1, wherein the rotor hub interface includes a rabbet configured to form a couple with a complementary portion of the rotor hub.

5. The fan assembly element of claim 4, wherein the rabbet includes a set of undercuts.

6. The fan assembly element of claim 1, wherein the fan blades of the first set of fan blades have any of: a convex shape, a concave shape, or a linear shape.

7. The fan assembly element of claim 1, further comprising:
   a second set of fan blades;
   a second axially outer shroud segment located axially outboard of the first axially outer shroud segment and physically connected to the second set of fan blades;
   wherein each fan blade of the second set of fan blades includes a first axial end fully connected to the first axially outer shroud segment and a second axial end fully connected to the second axially outer shroud segment; and
   wherein the fan assembly is configured to allow fluid flow between adjacent fan blades of the second set of fan blades during operation of the dynamoelectric machine.

8. A segmented fan assembly comprising:
   a rotor hub; and
   a set of fan assembly elements physically connected to the rotor hub, wherein each of the fan assembly elements is physically connected to adjacent fan assembly elements in the set of fan assembly elements to form a substantially continuous body, and each of the fan assembly elements includes:
      an axially inner shroud segment configured to form a portion of an annular assembly about a rotor of a dynamoelectric machine; wherein at least one circumferentially facing surface of the axially inner shroud segment includes a mating surface configured to form a seal with a circumferentially facing surface of a complementary fan assembly element;
      wherein the axially inner shroud segment includes a rotor hub interface configured to physically connect to a complementary portion of the rotor hub;
      a first set of fan blades physically connected to and extending axially from a face of the axially inner shroud segment; and a first axially outer shroud segment physically connected to the first set of fan blades; wherein the axially inner shroud segment and the first axially outer shroud segment are axially spaced from one another relative to the rotor hub;

wherein each fan blade includes a first axial end fully connected to the axially inner shroud segment and a second axial end fully connected to the first axially outer shroud segment; and wherein the fan assembly is configured to allow fluid flow between adjacent fan blades of the first set of fan blades during operation of the dynamoelectric machine.

9. The segmented fan assembly of claim 8, further comprising a shroud ring physically connected to the first axially outer shroud segments of the set of fan assembly elements.

10. The segmented fan assembly of claim 8, wherein the axially inner shroud segment defines a set of apertures configured to receive a set of bolts, wherein the set of bolts connecting the fan assembly element to the rotor hub.

11. The segmented fan assembly of claim 8, wherein the set of apertures in the axially inner shroud segment are counter-bored.

12. The segmented fan assembly of claim 8, wherein a circumferentially facing surface of the first axially outer shroud segment includes at least one mating surface configured to form a seal with a circumferentially facing surface of a complementary fan assembly element.

13. The segmented fan assembly of claim 8, wherein the rotor hub interface includes a rabbet configured to form a couple with a complementary portion of the rotor hub.

14. The segmented fan assembly of claim 8, wherein the fan blades of the first set of fan blades have any of: a convex shape, a concave shape, or a linear shape.

15. The segmented fan assembly of claim 8, further comprising:
a second set of fan blades;
a second axially outer shroud segment located axially outboard of the first axially outer shroud segment and physically connected to the second set of fan blades;
wherein each fan blade of the second set of fan blades includes a first axial end fully connected to the first axially outer shroud segment and a second axial end fully connected to the second axially outer shroud segment; and wherein the fan assembly is configured to allow fluid flow between adjacent fan blades of the second set of fan blades during operation of the dynamoelectric machine.

16. A dynamoelectric machine comprising:
a stator;
a rotor disposed substantially within the stator;
a rotor hub disposed circumferentially about a portion of the rotor; and
a set of fan assembly elements physically connected to the rotor hub; wherein each of the fan assembly elements is physically connected to adjacent fan assembly elements in the set of fan assembly elements to form a substantially continuous body, and each of the fan assembly elements includes:
an axially inner shroud segment configured to form a portion of an annular assembly about a rotor of a dynamoelectric machine; wherein at least one circumferentially facing surface of the axially inner shroud segment includes a mating surface configured to form a seal with a circumferentially facing surface of a complementary fan assembly element;
wherein the axially inner shroud segment includes a rotor hub interface configured to physically connect to a complementary portion of the rotor hub;
a first set of fan blades physically connected to and extending axially from a face of the axially inner shroud segment; and
a first axially outer shroud segment physically connected to the first set of fan blades; wherein the axially inner shroud segment and the first axially outer shroud segment are axially spaced from one another relative to the rotor hub;
wherein each fan blade includes a first axial end fully connected to the axially inner shroud segment and a second axial end fully connected to the first axially outer shroud segment; and
wherein the fan assembly is configured to allow fluid flow between adjacent fan blades of the first set of fan blades during operation of the dynamoelectric machine.

17. The dynamoelectric machine of claim 16, wherein at least one circumferentially facing surface of the first axially outer shroud segment include a mating surface configured to form a seal with a circumferentially facing surface of a complementary fan assembly element.

18. The dynamoelectric machine of claim 16, wherein the axially inner shroud segment defines a set of counter-bored apertures configured to receive a set of bolts, wherein the set of bolts connecting the fan assembly element to the rotor hub.

19. The dynamoelectric machine of claim 16, wherein the rotor hub interface includes a rabbet configured to form a couple with a complementary portion of the rotor hub.

20. The dynamoelectric machine of claim 16, further comprising:
a second set of fan blades;
a second axially outer shroud segment located axially outboard of the first axially outer shroud segment and physically connected to the second set of fan blades;
wherein each fan blade of the second set of fan blades includes a first axial end fully connected to the first axially outer shroud segment and a second axial end fully connected to the second axially outer shroud segment; and
wherein the fan assembly is configured to allow fluid flow between adjacent fan blades of the second set of fan blades during operation of the dynamoelectric machine.

* * * * *